United States Patent [19]
Lee et al.

[11] Patent Number: 5,974,402
[45] Date of Patent: Oct. 26, 1999

[54] ADDRESS DECODER WITH MEMORY WAIT STATE CIRCUIT

[75] Inventors: Young W. Lee, Orange; Sungwon Moh, Wilton; Arno Muller, Westport, all of Conn.

[73] Assignee: Pitney Bowes Inc., Stamford, Conn.

[21] Appl. No.: 08/163,812

[22] Filed: Dec. 9, 1993

[51] Int. Cl.$^6$ .................................................. G07B 17/00
[52] U.S. Cl. .......................... 705/401; 705/410; 711/100
[58] Field of Search ....................... 364/464.02; 365/194, 365/195; 395/775; 705/401, 410; 711/100

[56] References Cited

U.S. PATENT DOCUMENTS

| | | | |
|---|---|---|---|
| 4,789,257 | 12/1988 | Brown, III et al. | 400/582 |
| 4,889,439 | 12/1989 | Cook et al. | 400/706 |
| 4,957,380 | 9/1990 | Gerstle et al. | 400/279 |
| 5,013,167 | 5/1991 | Ervin et al. | 400/63 |
| 5,097,437 | 3/1992 | Larson | 395/500 X |
| 5,552,991 | 9/1996 | Lee et al. | 705/410 |

*Primary Examiner*—Edward R. Cosimano
*Attorney, Agent, or Firm*—Charles G. Parks, Jr.; Angelo N. Chaclas; Melvin J. Scolnick

[57] ABSTRACT

An electronic postage meter control system having a printer for printing mixed graphic and alphanumeric information. The control system includes a programmable microprocessor in bus communication with the printer for controlling the printer and with a plurality of memory units for accounting for postage printed by the printer. The memory units include at least a first memory unit having a write access time shorter than the write access time of a second one of said memory unit, a program memory in bus communication with the programmable microprocessor having an operating program stored therein. The programmable microprocessor is able to access the operating program, an integrated circuit, the program memory, and said first and second units. The integrated circuit has an address decoding module for generating one of a plurality control signals in a unique combination in response to a respective request by the programmable microprocessor. Respective ones of the control signals are the memory write enable signals for write enabling the first or second units where write enable signals are directed to the respective memory unit. The control system further maintains the respective write enable control signals active for at least the write access time of the first memory unit in response to generation of a respective one of the write enable control signals by the address decoder. The control system further maintains the respective write enable control signal active for an additional second period such that sum period of the first period of time in combination with the second period of time is at generally equal to the write access time required by the second memory unit.

1 Claim, 7 Drawing Sheets

ADDRESS DECODER WITH MEMORY WAIT STATE CIRCUIT

RELATED APPLICATIONS

The following co-pending applications are commonly assigned to Pitney Bowes Inc., filed concurrently on Dec. 9, 1993, U.S. patent application Ser. No. 08/163,627, entitled MULTIPLE PULSE WIDTH MODULATION CIRCUIT; now abandoned; U.S. Pat. No. 5,471,608 entitled DUAL MODE TIMER-COUNTER; U.S. Pat. No. 5,475,621, entitled DYNAMICALLY PROGRAMMABLE TIMER-COUNTER; U.S. Pat. No. 5,377,264 entitled MEMORY ACCESS PROTECTION CIRCUIT WITH ENCRYPTION KEY; U.S. patent application Ser. No. 08/163,811, entitled MEMORY MONITORING CIRCUIT FOR DETECTING UNAUTHORIZED MEMORY ACCESS; now abandoned; U.S. patent application Ser. No. 08/163,771, entitled MULTI-MEMORY ACCESS LIMITING CIRCUIT FOR A MULTI-MEMORY DEVICE, now abandoned; U.S. Pat. No. 5,530,840, entitled ADDRESS DECODER WITH MEMORY ALLOCATION FOR A MICRO-CONTROLLER SYSTEM; U.S. patent application Ser. No. 08/163,810 entitled INTERRUPT CONTROLLER FOR AN INTEGRATED CIRCUIT; U.S. patent application Ser. No. 08/163,813, entitled ADDRESS DECODER WITH MEMORY ALLOCATION AND ILLEGAL ADDRESS DETECTION FOR A MICRO-CONTROLLER SYSTEM, now abandoned; U.S. Pat. No. 5,483,458, entitled PROGRAMMABLE CLOCK MODULE FOR POSTAGE METERING CONTROL SYSTEM and U.S. Pat. No. 5,552,991, entitled CONTROL SYSTEM FOR AN ELECTRONIC POSTAGE METER HAVING A PROGRAMMABLE APPLICATION SPECIFIC INTEGRATED CIRCUIT, all of which patent applications are now pending.

BACKGROUND OF THE INVENTION

The present invention relates to a address decoding system for a microcontroller system and, more particularly, to an address decoding system particularly suited for postage metering applications.

In electronic postage metering machines, and like devices, it is customary to develop a specific microcontroller system for each model of postage meters to accommodate the unique control requirements of each meter model. Conventionally, a microcontroller system, of the type customarily used in postage metering applications, is comprised of a programmable microprocessor in bus communication with a read-only memory (ROM) or program memory, random access memory (RAM), non-volatile memories (NVMs) and an application specific integrated circuit (ASIC). Conventionally, the ASIC chip generates the chip select signals and write enable signal in order to write to the NVMs pursuant to address instructions from the microprocessor. One of the factors which have predicated customization of the ASIC is that the microprocessor bus cycle is matched to the write time required by the nonvolatile memories.

SUMMARY OF THE INVENTION

It is an objective of the present invention to present an improved microcontroller system which incorporates an ASIC in combination with a plurality of non-volatile memory devices wherein the ASIC includes a circuit having non-volatile memory wait state whereby after the microprocessor has addressed an instruction to the ASIC to write enable or read enable the NVMs and data is placed on the data bus, the microprocessor is forced to extend the duration of the low cycle for a predetermined period.

The microcontroller system is comprised of a programmable microprocessor in bus communication with a read-only memory (ROM) or program memory, random access memory (RAM), non-volatile memories (NVM) and an application specific integrated circuit (ASIC). The ASIC includes an address decoder system. The address decoder system is comprised of a Memory Size Register (MSR), Over-Lay Register (OVR), Address Decoder and illegal address detection. Upon power-up of the control system, the initial state of the ASIC enables the ROM for reading by the microcontroller. During the start-up routine, the MSR registers 0 through 8 are written into with a respective 8-bit address configuring the decoder for the particular system. Each address represents the upper valid address of the system memory map for the memory devices.

The ASIC Address Decoder when it receives a valid address from the microprocessor generates the appropriate chip select and write or read enabling signal enabling access to the appropriate memory. If the selected memory is one of the NVM, the respective chip select signal is directed not only to the NVM enable pin but also to a delay circuit. The delay circuit delays the generation of a DTACK signal for a desired time which is sufficiently long enough to assure a completed memory access of NVM unit selected. For example, EEPROMS requires additional access time to complete a write cycle as contrasted against a battery-backed memory which is noted for its relatively short write cycle time. The DTACK is directed to the microprocessor which suspends activity on the data lines in a conventional manner until the DTACK signal is received. In this manner, once the microprocessor has issued an appropriate write address instruction to the ASIC, the microprocessor is presented from terminating the bus cycle in the normal shorter time.

BRIEF DESCIPTION OF THE DRAWINGS

DETAILED DESCRIPTION OF THE PREFERRED EMBODIMENT

Figure 1:
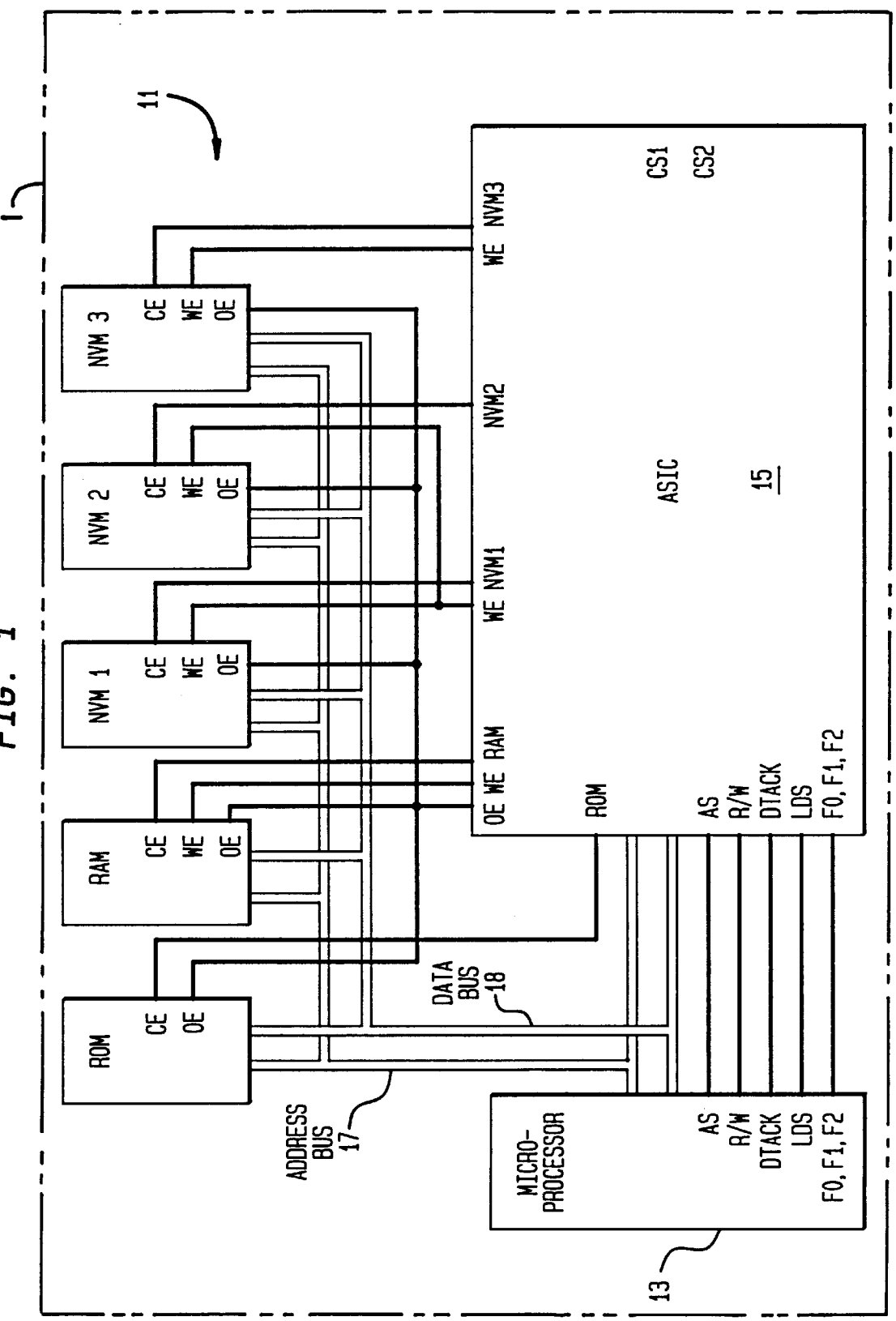
FIG. 1 is a schematic of a microcontroller system in accordance with the present invention.

Referring to FIG. 1, a microcontroller system, generally indicated as 11, is comprised of a microprocessor 13 in bus communication with an application specific integrated circuit (ASIC) 15, a read only memory (ROM), a random access memory (RAM) and a plurality of non-volatile memories (NVM 1, NVM 2, NVM 3 ) via address bus 17 and data bus 18. The microprocessor 13 also communicates with the ASIC and memory units by way of a plurality of control lines, some of which will be more particularly described subsequently. The ASIC enables the memory units (ROM, RAM, NVM 1, NVM 2 and NVM 3 ) by selectively enabling selective control lines. It should be appreciated that the ASIC 15 includes a number of circuit modules to perform a variety of control functions relative to the operation of the host device, which, in the present preferred embodiment, the host device is a postage meter mailing machine 1. However, for the purpose of the present invention only the address decoder and memory control functions will be here particularly described.

Figure 2:
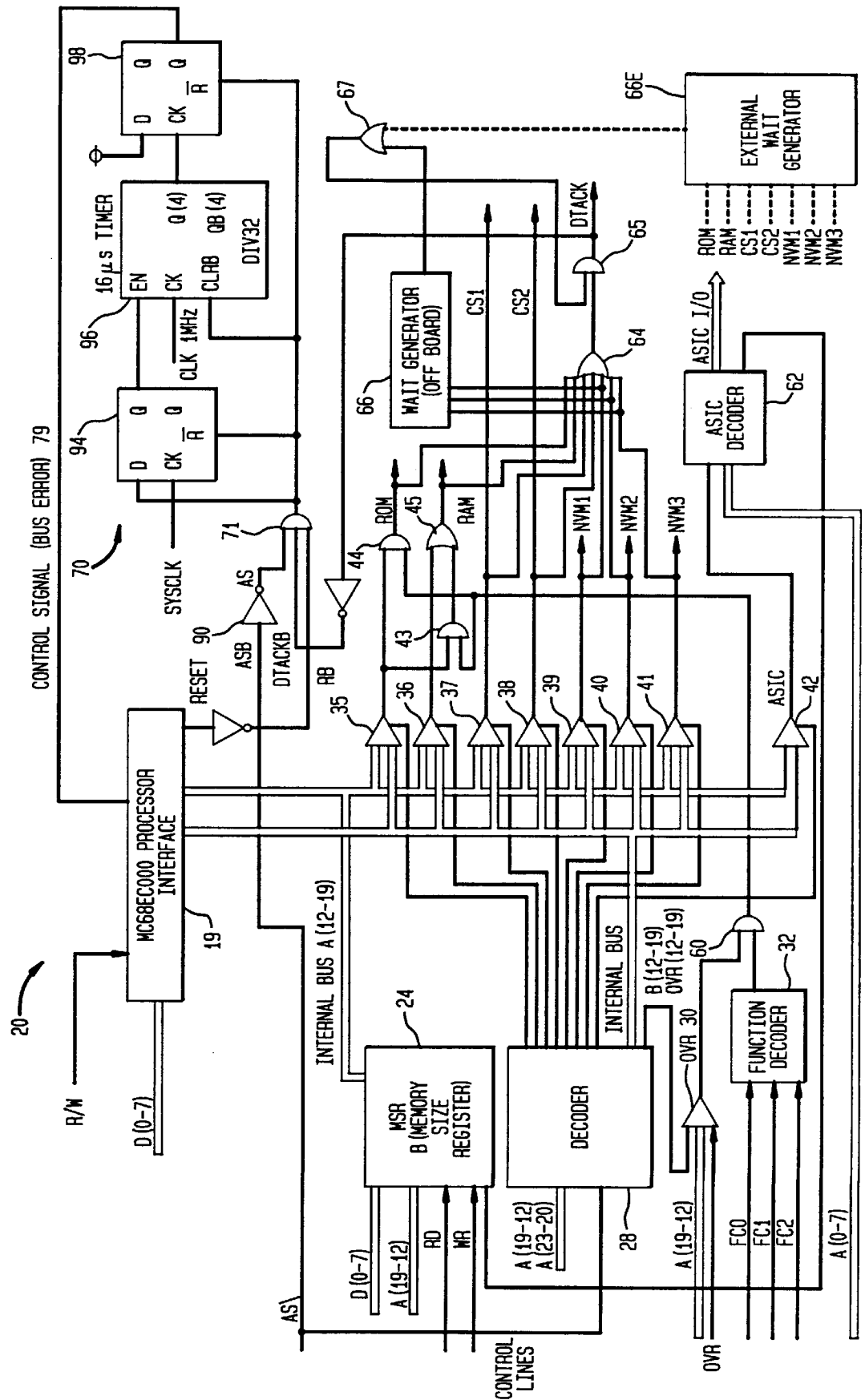
FIG. 2 is a schematic of an ASIC decoder system in accordance with the present invention.
Figure 3:
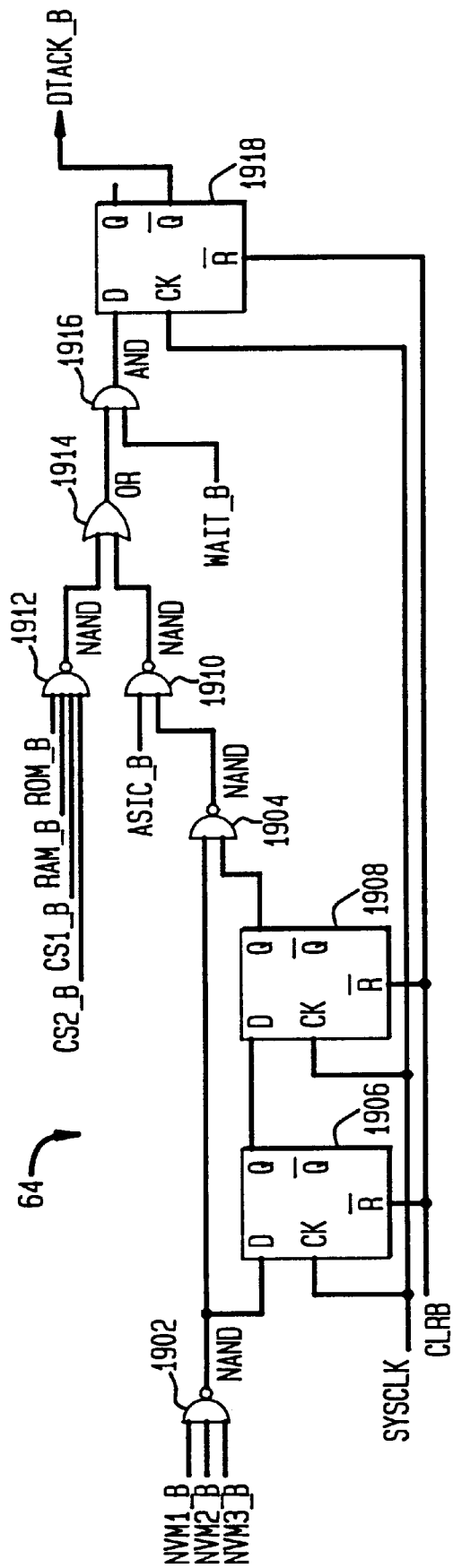
FIG. 3 is a schematic of a non-volatile memory delay circuit in accordance with the present invention.

Referring to, more particularly, FIGS. 2 and 3, the ASIC 15 includes an Address Decoder Circuit, generally indicated as 20. The ASIC 15 includes a processor interface chip 19 containing interface logic necessary to interface the ASIC 15 to the microprocessor 13, which in the preferred embodiment of the present invention and is manufactured by Motorola, Model MC68EC000. The processor interface chip 19 functions to provide signal conditioning, among other things, at the detection of an illegal address in a manner subsequently described. The memory size (MSR) 24 is in communication with the address bus 17 (address bus lines 19–12 ) to receive a 8-bit address from the microprocessor 13. The address strobe (AS) output from the microprocessor 13 is directed to a memory decoder section 28 and through inverter 90 to an AND gate 71 associated with the illegal address detection circuit 70 of the system. The decoder 28 also communicates with the address bus 17 (address bus lines 23–20, 19–12 ) to receive 12-bit address information from the microprocessor 13. Also provided is a memory over-write comparator circuit (OVR) 30 and function decoder unit 32.

Referring also to FIG. 1, the output from the memory size register 24 is carried by the 8-bit internal bus "A" and the output from the decoder 28 is carried by the 8-bit internal bus "B". The one input of each of a plurality of comparators 35 through 42 is in communication with internal bus A and internal bus B. The output of comparator 35 is directed to AND gates 43 and 44 and the output of comparator 36 is directed to an OR gate 45. The output from gate 44 is internally directed to the ROM pin of the ASIC. The output of the gate 45 is internally directed to the RAM pin of the ASIC. The output from comparators 37 and 38 are respectively directed to ASIC pins CS1 and CS2, and are intended to provide a memory write-enable signal for external devices which may be connected to the control system. The output of comparators 39, 40 and 41 are respectively directed internally to the chip select NVM1, NVM2 and NVM3.

A control signal OVR, from the microcontroller, is directed to the input side of the overlay comparator circuit 30 and enables accessing of the memory address supplied from the decoder 28 to the memory overlay block 30. The function of the ROM-RAM overlay will be described subsequently in more detail. Here briefly, the function of ROM-RAM enabled data fetch or program transfer enables the microprocessor to utilize the same address range in ROM or RAM depending of the state of control signals "FC0", "FC1" and "FC2" generated by the microcontroller. The control signals "FC0 ", "FC1" and "FC2" are directed, from the microcontroller, to the input side of a function decoder 32. The outputs of the overlay comparator chip 30 and the function decoder 32 are directed to AND gate 60 which has an output directed to the inverse input of gate 44 and input of gate 43. The output of comparator 42 is directed to the input of an ASIC Decoder 62. The output of the ASIC Decoder 62 is used for providing internal addressing of the ASIC 15. A control output of the ASIC 62 is directed to the MSR 24 which enables the memory size registers for writing during system power-up.

Referring again to the comparators 37 through 41, gates 44 and 45, the output from each comparators and gates are also directed to an OR circuit 64 which has an output directed to gate 65. The output of gate 65 is "DTACK". Also the output from each comparator 39, 40 and 41 is directed to a Wait Generator 66. The output of the Wait Generator 66 is directed to inverse input of gate 67. The Wait Generator 66 output, when enabled, delays the issuance of the DTACK signal for a programmed period of time and also suppresses the timer 96 of the illegal address dection circuit 70 for the same amount of time. The purpose of delaying the DTACK is based on the fact that the write time for external devices may be protected. Therefore to avoid that, the microprocessor terminate the bus cycle, the issuing of the DTACK signal is delayed for an appropriate amount of time. In this preferred embodiment, the DTACK signal generation is delayed by two clock cycles to satisfy the minimum pulse width of the write enable signal for the NVM memory.

Referring to FIG. 3, the chip select signals RAM and ROM are also directed to an NAND gate 1912 which is enabled at the presence of an enabled signal. The output enables OR gate 1914 which enables the AND gate 1916 to enable a flip-flop 1918, described in more detail subsequently, to issue the DTACK signal. In like manner, when the chip selects NVM 1, NVM 2 or NVM 3 are selected, the presence of the counter 1906 and 1908 between NAND gates 1902 and 1904 delay the NAND gate 1910 from going active to enable the OR gate 1914. When any chip select signals is generated, AND gate 1916 may be held disabled until a wait signal is set inactive by an external wait generator similar to wait generator 66. In further like manner, when the ASIC chip select signal is active, the NAND gate 1910, OR gate 1914 and AND gate 1916 are enabled to cause the flip-flop 1918 to issue the DTACK signal.

Operation

In the preferred embodiment, the microprocessor interface 19 is intended to contain peripheral capabilities such as print head interface, keyboard and display interface, and asynchronous communication elements for RS232.

The microprocessor 13 operates in either of two modes, program fetch or data transfer mode. The status signals (FC2, FC1, FC0) of the microprocessor 13 indicates the state and cycle of an instruction that the microprocessor is currently executing. The status signals also indicate that the microprocessor is in either program fetch or data transfer mode. The status signals are also used for the ROM-RAM overlay and chip select. Table 1 shows the bit messaging for the function decoder 32.

TABLE 1

| FC2 | FC1 | FC0 | Cycle Time | Chip Select |
| --- | --- | --- | --- | --- |
| 0 | 0 | 1 | User Data | RAM |
| 0 | 1 | 0 | User Program | ROM |
| 1 | 0 | 1 | Supervisor Data | RAM only |
| 1 | 1 | 0 | Supervisor Program | RAM only |

Figure 4A:
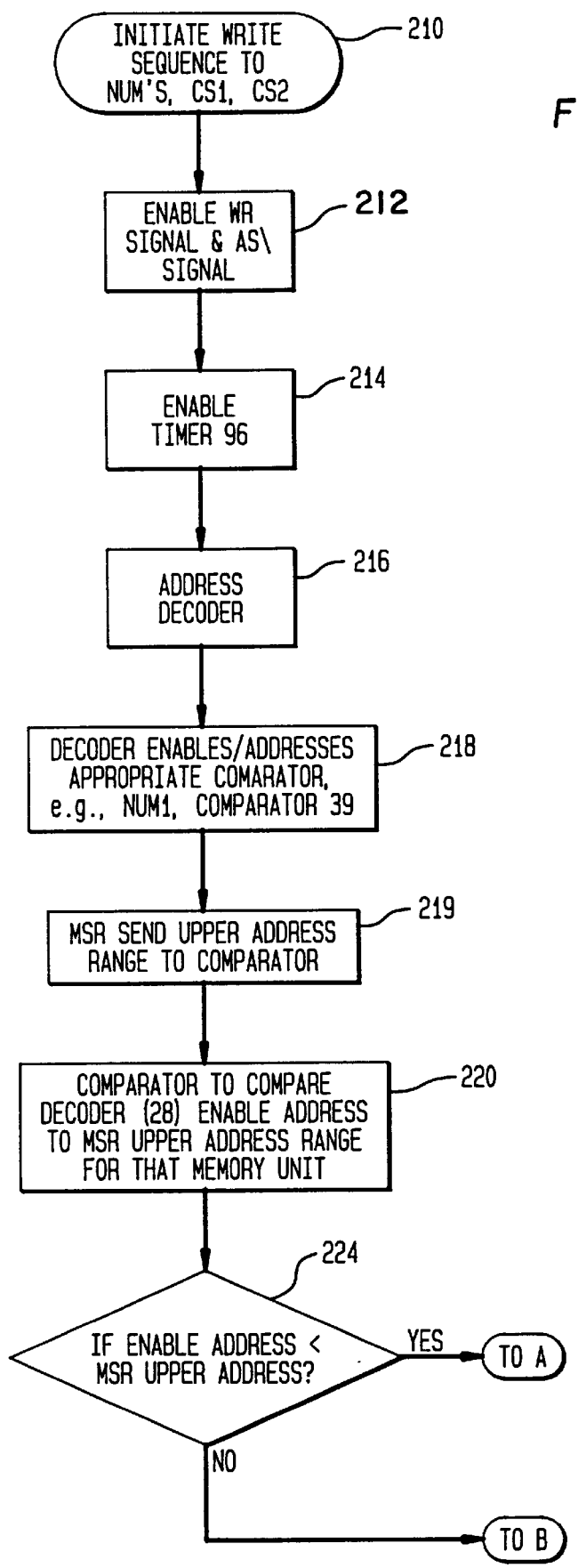
FIGS. 4A and 4E are logic flow charts of a microcontroller system write access to the non-volatile peripheral memories in accordance with the present invention.
Figure 4B:
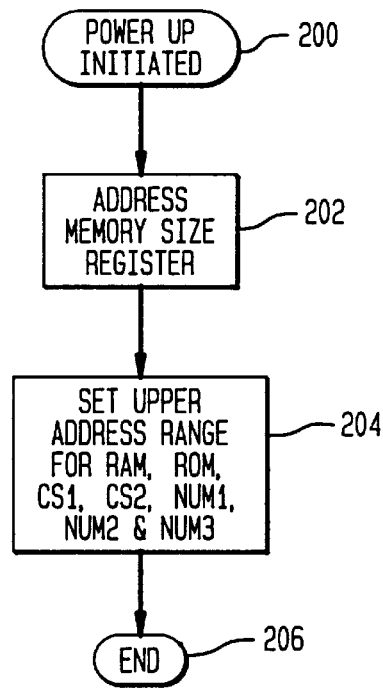
Figure 4C:
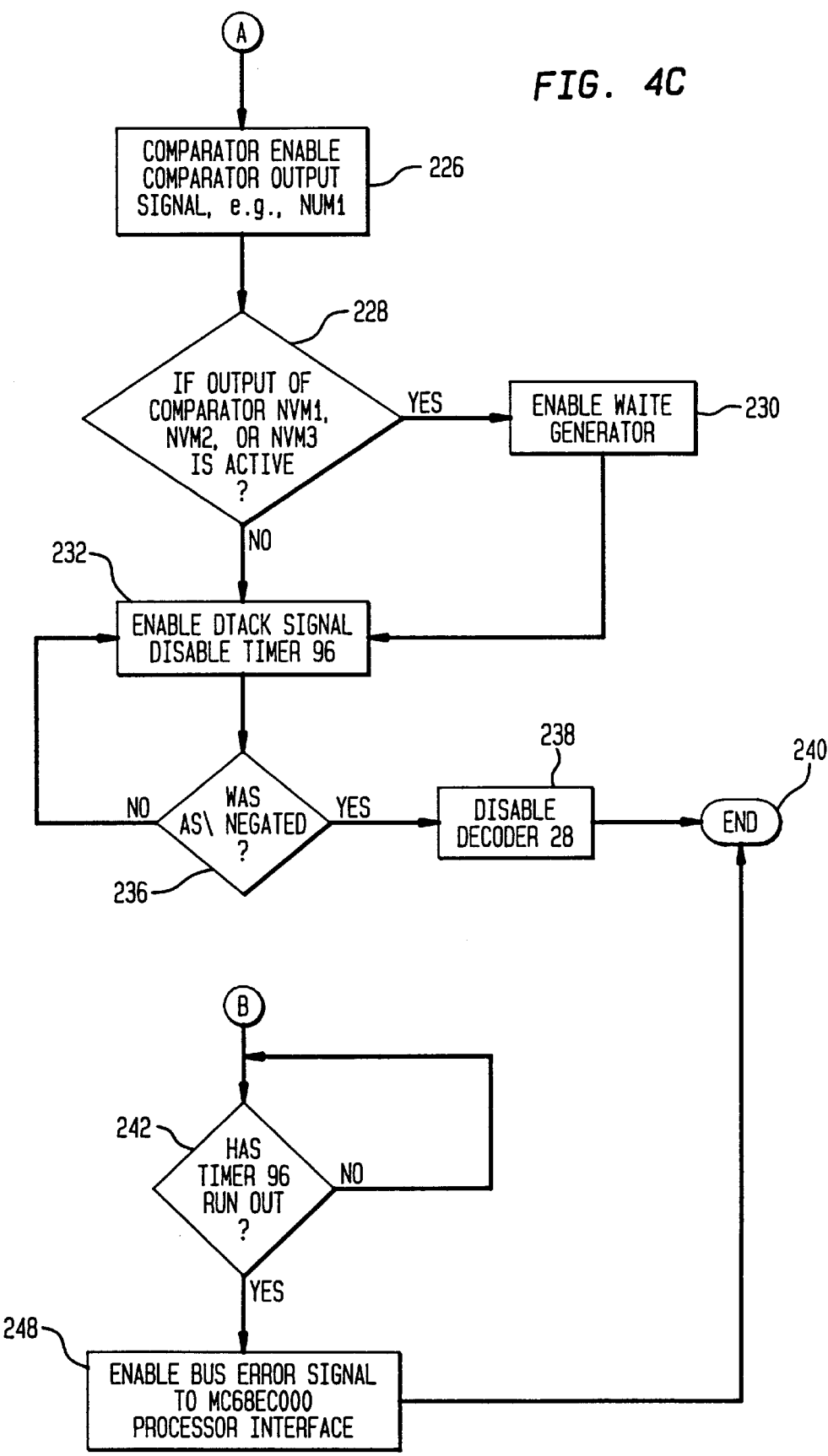
Figure 4D:
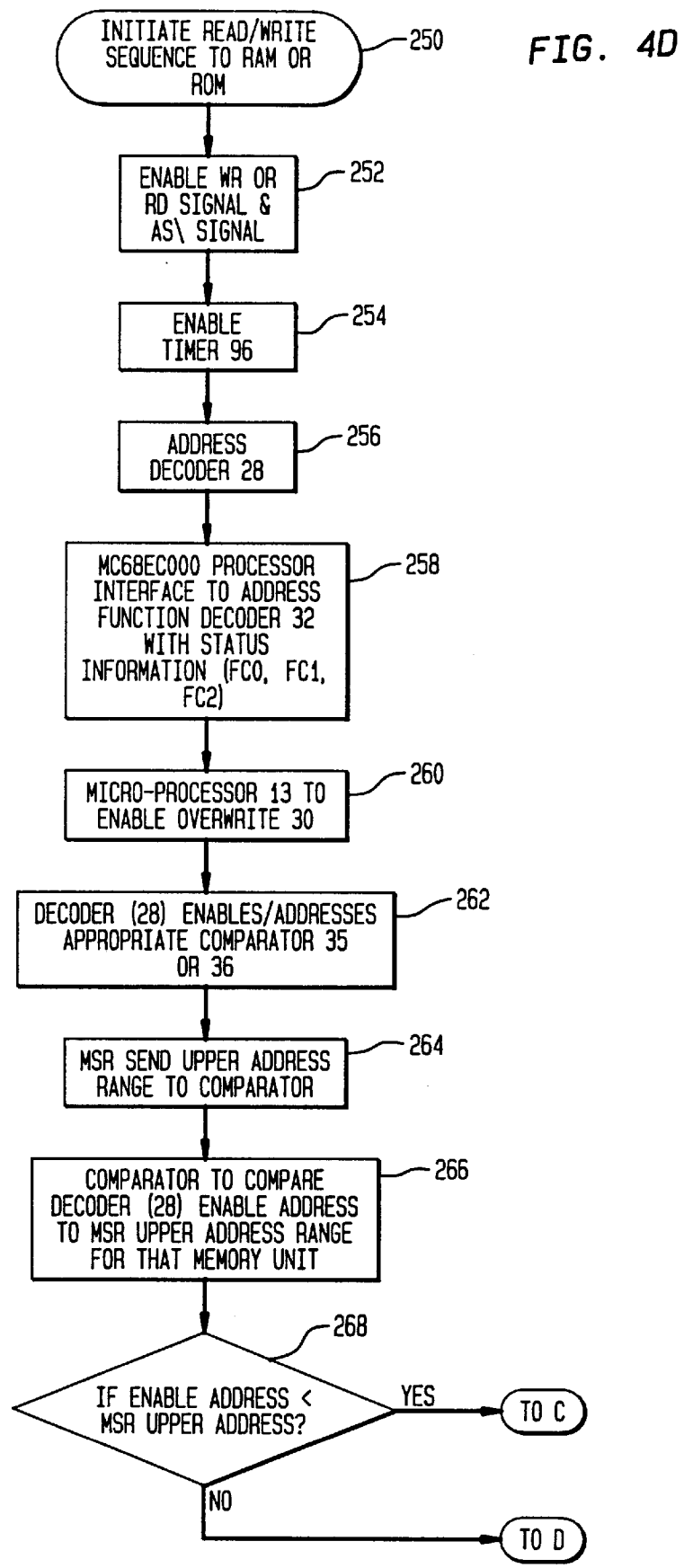
Figure 4E:
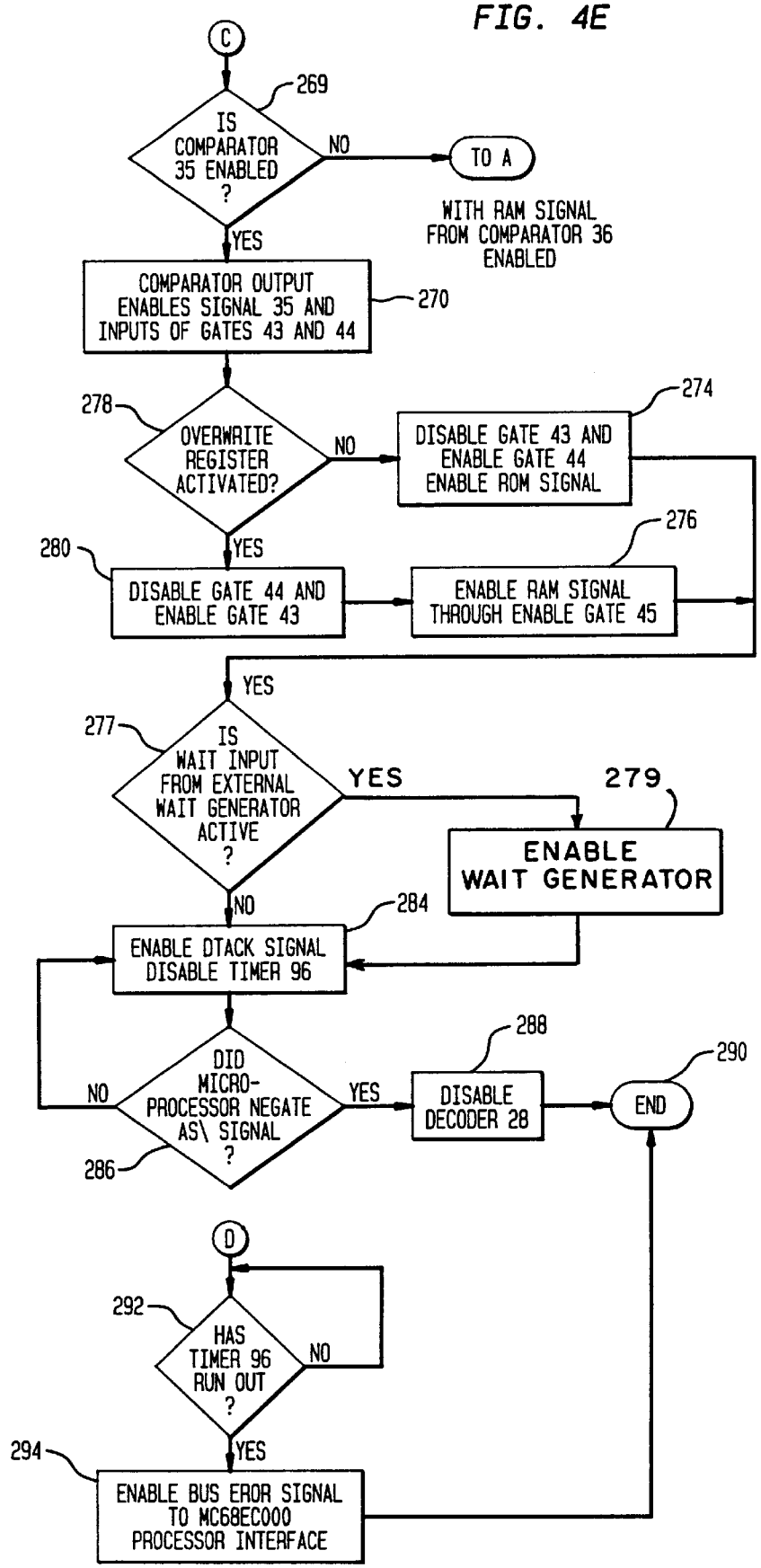

Referring to FIG. 4B, upon power-up, the system is initialized by the microcontroller at 200 which proceeds to address the memory size register at 202. The upper address range for the RAM, ROM, CS1, CS2, NVM1, NVM2 and NVM3 are set at 204 by the microprocessor writing to the MSR. The routine then ends at 206.

Referring to FIGS. 4A through 4E, now described is the procedure for initiating a write sequence to the NVMs or ASIC on board memory. At 250, the sequence is initiated by the microprocessor. At 252, the write enable or read enable signal is activated by the microprocessor and the AS\ signal is enabled. Following at 254, the timer 96 is enabled. Also, the address decoder 28 is addressed by the microprocessor at 256. The processor interface then proceeds to address a function decoder 32 with the status information as afore described at 258. The microprocessor 13 then proceeds to enable the overwrite signal at 260. At 262, the decoder 28 enables the appropriate address comparator 35 or 36. At 264, the upper ranges of the MSR are read through the data bus of ASIC.

The appropriate comparator compares the enable address to the MSR address range for the memory unit at 266. Subsequently, a test is performed at 268 to see if the MSR upper address is greater than the address from the decoder 28. If the address is less than the MSR upper address, the routine proceeds to 269. At 269, a test is performed to see which comparator, 35 or 36 is enabled. If comparator 35 is not enabled then proceed to 226 to enable the appropriate comparator, for example, comparator 36. Description of the operation that follow are continued below. If comparator 35 is enabled then at 270, the comparator 35 is enabled and the comparator output signal is generated for comparator 35. At which point, the decision is made as to whether the overwrite register has been activated at 278. If the overwrite register has not been activated, the routine proceeds to 274 to enable gate 44 and disable gate 43. If the overwrite register has been activated, then the routine proceeds to 280 to disenable 44 and enable the gate 43 and then proceeds to enable gate 45 at 276. A test is then performed at 277 to determine if a wait from an external wait generator has been set active. If a wait is active, the wait generator is enabled at 279 to time out. If the wait has timed out or has not been set active, the outputs from gate 44 or 45 is then directed to enable the DTACK signal and disable timer 96 at 284

Following enabling of the DTACK signal, a decision is made as to whether the microprocessor has negate AS\ at 286. If the microprocessor has not negated the AS\ signal at 286, the DTACK signal is held active. If the microprocessor has negated the address strobe AS\, then the decoder 28 is disabled at 288 and the routine is ended at 290.

Returning to 268, if the enable address is greater than the MSR upper address, then the routine proceeds to wait for the timer 96 to time out at 292. When timer 96 has run out a bus error signal is generated at 294 which is delivered to the processor interface for further processing, for example, a system interrupt. Following the bus error signal, the routine then proceeds to 290 to end.

Upon initiation of a write sequence to the non-volatile memories, NVM1, or NVM2 or NVM3 at 210, the process proceeds to 202 where the write enable signal and the AS\ signal are enabled. Following the enabling of the write enable and AS\ signals, the routine proceeds to enable the timer 96 at logic 214 and the microprocessor addresses the address decoder at 216. Pursuant to enabling of the address decoder 28, the appropriate comparator, for example, NVM1, comparator 39 is enabled at 218. During initialization in 200 to 206, the microprocessor addressed the memory size registers to set the proper address range for the respective comparators. The MSR sends the upper limit of addresses for the particular memory block to the respective comparator in 219. A comparator is enabled for comparison of the decoded enabled address to the memory size register upper address range for that memory at 220. Then following enabling of the proper comparator, a decision is made at 224. If the address compared by the comparator is less than that sent from the memory size register, the routine then proceeds to 226 where the appropriate comparator is enabled and the comparator output signal is directed, for example, to NVM1. Following enabling of the comparator output signal at logic block 226, a test is performed at 228 to see if the output of comparators to NVM1 or NVM2 or NVM3 is activated. If that output is enabled, an enabled wait generator 66 is activated at 230. Following the time out of the wait enable generator, an DTACK signal is generated at 232.

Returning to 228 if the comparator 39, 40 or 41 is not activated, then the DTACK signal is immediately activated at 232. Following enablement of the DTACK, a test is performed to see whether the address strobe has been activated. If the address strobe has not been negated, the DTACK signal remained active. If at 236 the address strobe was negated, the decoder 28 is then disabled at 238 and the routine is ended at logic block 240.

Returning to 224, if the enable address is greater than the MSR upper address range, then the routine proceeds to 242 to wait for timer 96 to run out. When the timer 96 runs out it sets flip-flip 98, the Q\ output therefrom enables a bus error signal to be sent to the processor interface at 248 and the routine is ended at 240. It should now be appreciated that any address issued by the address decoder in response to the microprocessor is tested by the corresponding comparator 35 to 42 depending on the setting of the most significant bits of the issued address.

Referring to FIG. 2, it is noted that the DTACK signal, a System Reset signal from the microprocessor 13 and the AS signal from the timer 26 are inputs to the AND gate 71. The output of the AND gate 71 is directed to the enable input and reset of a flip-flop 94, the clock input of a 16-bit timer 96 and the reset pin of a flip-flop 98. The flip-flop 94 is driven by the system clock. The output from the flip-flop 94 is directed to the enable input of the timer counter 96. The output of the timer counter 96 is directed to the clock input of the flip-flop 98. The enable input of the flip-flop 98 is tied active. It should be appreciated that when the AS signal is inactive or the DTACK signal is active or the reset signal is active, the AND gate 71 is set inactive holding flip-flops 94 and 98 and timer 96 in reset.

The afore has described the preferred embodiment of the present invention and should not be viewed as limiting. The full scope of the invention is defined by the appendix claims.

What is claimed is:

1. An improved electronic postage meter control system having a printing means including means for printing mixed graphic and alphanumeric information in response to said control circuit, said control circuit including a programmable microprocessor in bus communication with said printing means for controlling said printing means and with a plurality of memory units for accounting for postage printed by said printing means, said memory units including at least a first memory unit having a write access time shorter than the write access time of a second one of said memory unit, a program memory means in bus communication with said programmable microprocessor having an operating program store therein, said programmable microprocessor being able to access said operating program, an integrated circuit in bus communication with said programmable microprocessor, said program memory, and said first and second units, wherein said improvement comprises:

said integrated circuit having an address decoding module means for generating one of a plurality control signals in a unique combination in response to a respective address placed on said bus by said programmable microprocessor, respective ones of said control signals being memory write enable signals for write enabling said first or second units, said write enable signals be directed to said respective memory unit;

means for maintaining said respective write enable control signals active for at least a first period equal to at least said write access time of said first memory unit in response to generation of a respective one of said write enable control signals by said address decoder; and second means for further maintaining said respective write enable control signal active for an additional second period such that sum period of said first period of time in combination with said second period of time is at generally equal to said write access time required by said second memory unit, said second means be responsive only to said write enable control signal generated by said address decoder for write enabling said second memory unit.

* * * * *